(12) United States Patent
Farrant et al.

(10) Patent No.: US 9,526,257 B1
(45) Date of Patent: Dec. 27, 2016

(54) FOOD PRESS MACHINE FOR PRESSING FOOD INTO PRESELECTED SHAPES

(71) Applicants: Chris Farrant, Suffolk (GB); Michael Watts, Norfolk (GB)

(72) Inventors: Chris Farrant, Suffolk (GB); Michael Watts, Norfolk (GB)

(73) Assignee: Dantech Innovations & Technology, LTD., Burscough (GB)

( * ) Notice: Subject to any disclaimer, the term of this patent is extended or adjusted under 35 U.S.C. 154(b) by 711 days.

(21) Appl. No.: 13/741,347

(22) Filed: Jan. 14, 2013

(51) Int. Cl.
*A22C 7/00* (2006.01)

(52) U.S. Cl.
CPC ............ *A22C 7/003* (2013.01); *A22C 7/00* (2013.01); *A22C 7/0023* (2013.01); *A22C 7/0046* (2013.01); *A22C 7/0061* (2013.01)

(58) Field of Classification Search
CPC ... A22C 7/0023; A22C 7/0046; A22C 7/0061; A22C 7/00; A22C 7/003
USPC ...... 425/324.1, 352, 353, 355, 376.1; 100/3, 100/179, 194, 232, 233, 295, 910
See application file for complete search history.

(56) References Cited

U.S. PATENT DOCUMENTS

| | | | | |
|---|---|---|---|---|
| 3,040,654 A | * | 6/1962 | Opie | 100/347 |
| 3,756,231 A | * | 9/1973 | Ross | 100/232 |
| 3,759,170 A | | 9/1973 | Bettcher | |
| 4,150,615 A | * | 4/1979 | Russell | 100/7 |
| 4,565,512 A | * | 1/1986 | Wills et al. | 425/190 |

* cited by examiner

*Primary Examiner* — Seyed Masoud Malekzadeh
(74) *Attorney, Agent, or Firm* — LaMorte & Associates, P.C.

(57) ABSTRACT

A food press machine that is used to shape food, such as slabs of meat. The machine has a jaw element. The jaw element is free to rotate about a pivot connection along a curved path between a closed position and an open position. A lower mold head is mounted to a base. An upper mold head is mounted to the jaw element. The upper mold head aligns atop the lower mold head and defines a compression chamber when the jaw element is in its closed position. Conversely, the upper mold head is lifted away from the lower mold head when the jaw element is in its open position. Food is placed in the compression chamber when the jaw element is in its open position. The jaw element is than moved to its closed position with the power of a hydraulic piston.

11 Claims, 4 Drawing Sheets

FOOD PRESS MACHINE FOR PRESSING FOOD INTO PRESELECTED SHAPES

BACKGROUND OF THE INVENTION

1. Field of the Invention

In general, the present invention relates to food presses that are used to compress food into various shapes. More particularly, the present invention relates to the hydraulic drive mechanisms of food presses that cause molds to press against food in order to reshape the food.

2. Prior Art Description

Animals of each species come in a variety of shapes and sizes. The variety in size and shape of an animal can have many causes, such as the animal's age, sex, muscle tone, and diet. As a consequence, the cuts of meat from the same parts of two animals are never identical in weight, density, fat content, shape and/or size.

In the meat industry, some cuts of meat are expected to have a relatively standard shape. A good example of such a cut of meat is bacon. Bacon is a cured meat prepared from pork. Bacon can be prepared from several different cuts of pork. In different regions of the world, bacon is produced from the side and/or back cuts of pork. However, in the United States, bacon is primarily made from pork belly. Outside of the United States, pork belly bacon is often referred to as "streaky bacon", "fatty bacon", or "American style bacon".

In the United States, most consumers buy bacon at a retail grocery store. In the grocery store, the bacon is prepackaged and pre-sliced into strips. Within the packaging, retailer consumers expect the slices of bacon to be generally uniform in length, height and thickness.

If a pork belly were just to be sliced into bacon strips, the bacon strips would vary greatly in length and height. Furthermore, much of the meat on the pork belly would be wasted because it would be cut into dimensions that are too small to serve as bacon strips. As a result, it is common for meat packers to reshape pork bellies before they are cut into bacon strips. In this manner, most all of the pork belly can be cut into acceptable bacon strips.

To shape pork bellies into bacon, the pork bellies are often set into a machine press. Molds are forced against the meat under the force of hydraulic pistons. The result is that the meat conforms to the shapes of the mold. Consequently, sections of the meat that are too thick are pressed thinner, while thin sections of the meat are made larger. The result is that each piece of meat leaving the machine press has uniform dimensions. Such prior art meat pressing machines are exemplified by U.S. Pat. No. 3,759,170 to Bettcher, entitled Food Press.

Prior art meat pressing machines, however, do have some disadvantages. Most prior art meat presses compress a piece of meat with only linear compression forces. That is, the top surface of the meat is pressed directly toward the bottom surface of the meat. The two ends of the piece of meat are pressed toward each other. This extrudes the meat into the shape of the molds. However, the direct linear compression of the meat can cause the meat to ripple as it extrudes within the mold. Furthermore, the direct linear compression can cause lines between fat and meat to separate as the meat shears under the compression forces. Both effects can ruin a slab of meat, causing the misshaped slab of meat to be used as scrap.

A secondary concern in compressing a slab of meat with linear forces, is that a great deal of pressure is required to change the shape of meat under simple compression. As such, meat presses must be made to be very powerful. The meat presses, therefore, require a substantial amount of energy to run. The more energy it costs to shape a slab of meat, the more expensive that slab of meat becomes at market.

Yet another problem associated with many prior art meat presses is that the molds used in the presses can only be used on slabs of meat that are between a predetermined minimum size and maximum size. If a slab of meat is encountered that is outside the acceptable range, then the molds within the meat press must be changed. For example, the molds on a prior art meat press may be able to shape a slab of meat between seven and ten pounds. However, if a twelve pound slab is provided, the molds must be changed to compensate for the larger slab of meat. If a slab of meat is placed in a mold of the wrong size, it will either fail to be formed properly or will be squashed into scrap.

A need therefore exists for an improved meat press that can compress a slab of meat with complex, non-linear forces, so as to cause less damage to slabs of meat. A need also exists for an improved meat press that can automatically adjust to slabs of meat of different sizes without requiring the molds of the press be changed.

Lastly, a need also exists for a meat press that can shape slabs of meat using less energy. In this manner, the meat press is more efficient, thereby reducing the cost of processing the slab of meat.

These needs are met by the present invention as described and claimed below.

SUMMARY OF THE INVENTION

The present invention is a food press machine assembly that is used to shape food, such as slabs of meat. The food press machine has a jaw element that is connected to a base at a pivot connection. The jaw element is free to rotate about the pivot connection along a curved path between a closed position and an open position. The jaw element is moved by a hydraulic piston.

A lower mold head is mounted to the base. An upper mold head is mounted to the jaw element. The upper mold head moves with the jaw element along the curved path. The upper mold head aligns atop the lower mold head and defines a compression chamber when the jaw element is in its closed position. Conversely, the upper mold head is lifted away from the lower mold head and exposes the compression chamber when the jaw element is in its open position.

Food is placed in the compression chamber when the jaw element is in its open position. The jaw element is than moved to its closed position with the power of the hydraulic piston. The jaw element drives the upper mold head against the food along a curved path. The curved approach of the upper mold head reduces damage to the food being pressed.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention food press machine can be embodied to press many different types of food, such as cheeses, hams, deli meats and the like, the embodiment illustrated shows the system being used to shape a pork belly into what will become a shaped slab of bacon. This embodiment is selected in order to set forth one of the best modes contemplated for the invention. The illustrated embodiment, however, is merely exemplary and should not be considered a limitation when interpreting the scope of the appended claims.

Figure 1:
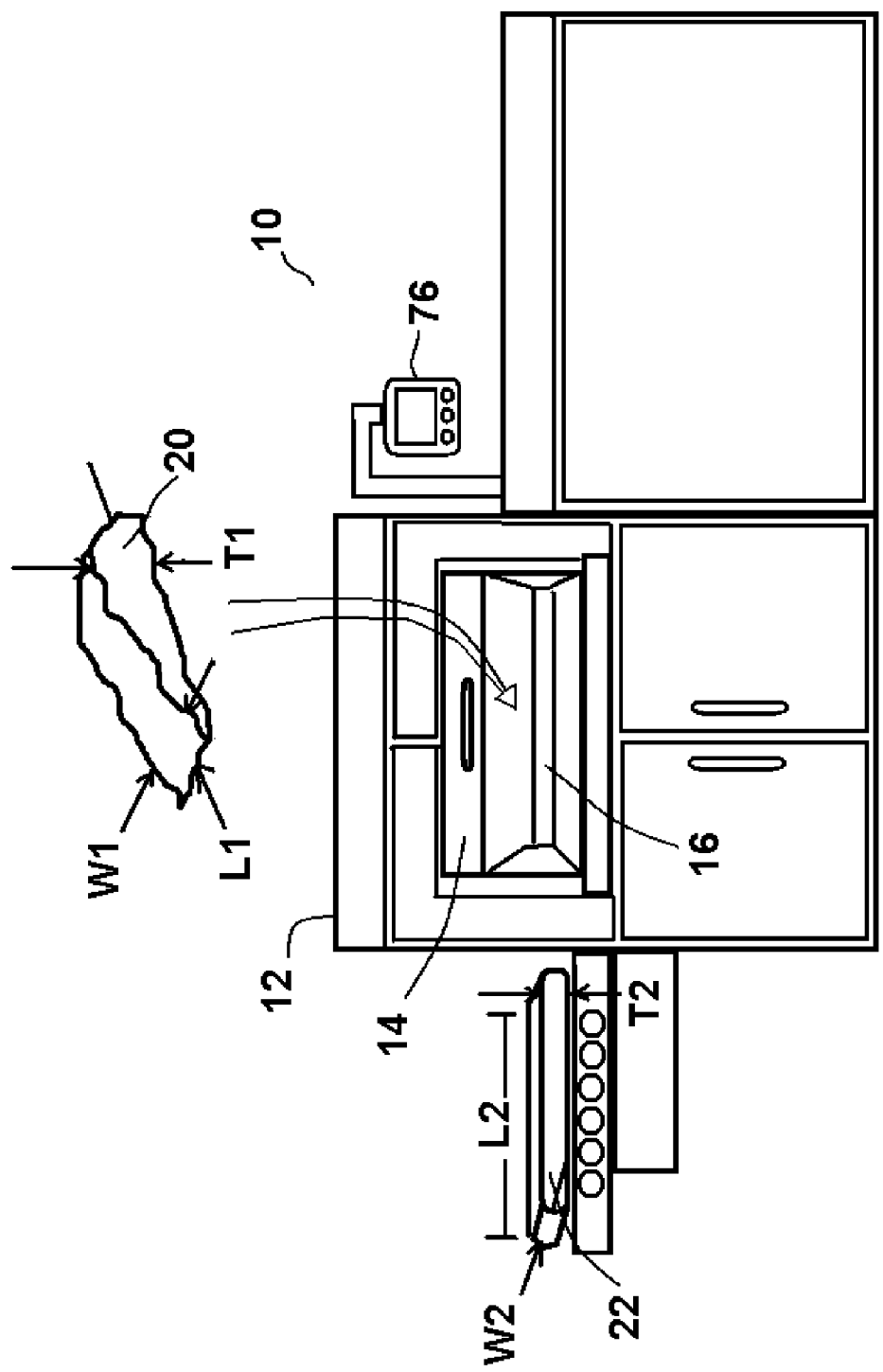
FIG. 1 is a perspective view of an exemplary embodiment of the food press machine.

Referring to FIG. 1, a food press machine 10 is shown. The food press machine 10 is a free standing unit that is designed to be used by commercial food processors. The food press machine 10 has a framework 12 that contains the various working assemblies of the food press machine 10. The various working assemblies of the food press machine 10 are shielded within the framework 12 to meet the various food sanitation regulations and OSHA safety regulations that are applicable.

The food press machine 10 has a loading door 14 that provides access to an internal compression chamber 16. A slab of meat 20 is placed inside the compression chamber 16 though the loading door 14. The slab of meat 20 is natural, having a maximum length L1, a maximum width W1, and a maximum thickness T1. However, the slab of meat 20 varies in length, width, and thickness due to the complex shape of the slab of meat 22. Once the slab of meat 20 is placed within the compression chamber 16, the loading door 14 is closed and the food press machine 10 compresses the slab of meat 20. The result is a processed slab of meat 22 that has a uniform width W2 and a uniform thickness T2, although the thickness many be purposely contoured. The length L2 of the processed slab of meat 22 varies as a function of the mass of the natural slab of meat 20, as will be later explained.

Figure 2:
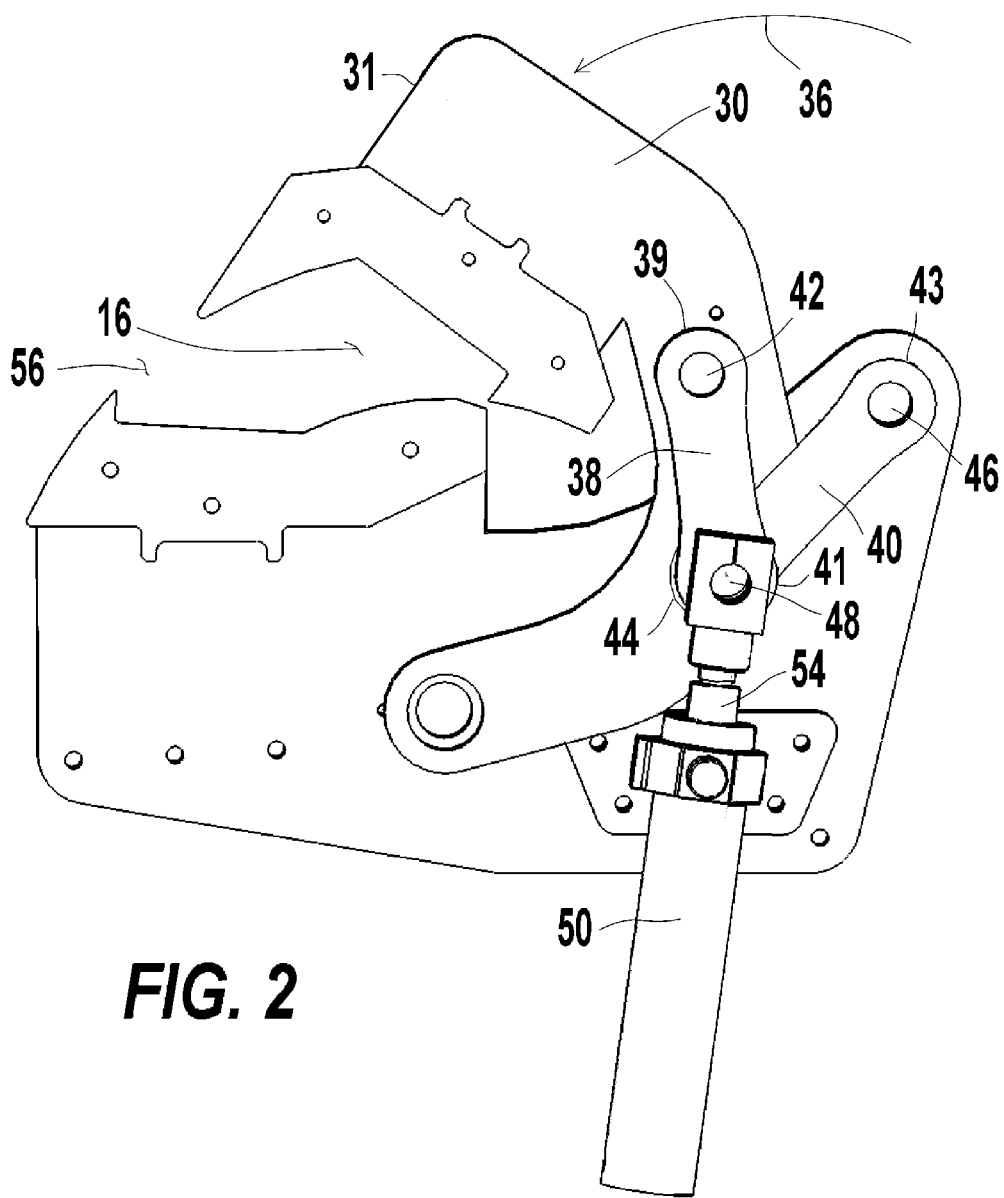
FIG. 2 is a side view of the press heads used within the food press machine, shown in an open configuration.
Figure 3:
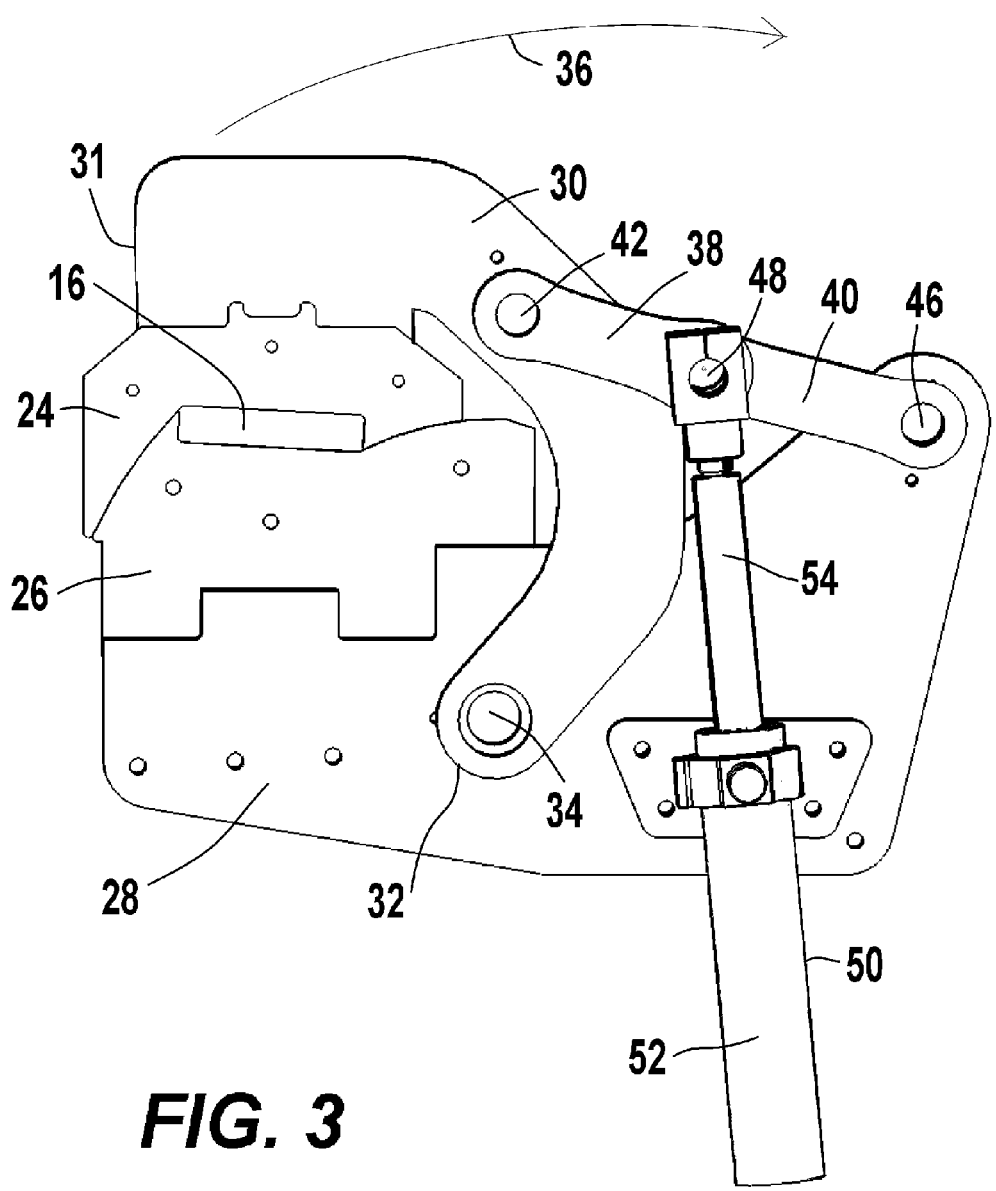
FIG. 3 is a side view of the press heads used within the food press machine, shown in a closed configuration.

Referring to FIG. 2 and FIG. 3 in conjunction with FIG. 1, it can be seen that the compression chamber 16 is the space defined between an upper mold head 24 and a lower mold head 26. In the shown embodiment, the upper mold head 24 and the lower mold head 26 define a compression chamber 16 that has the same profile as a slice of bacon when the upper mold head 24 and the lower mold head 26 are seated together. The lower mold head 26 is mounted to a stationary base 28. As such, the position of the lower mold head 26 does not change during the operation of the food press machine 10.

The upper mold head 24 is mounted to a curved jaw element 30. The curved jaw element 30 has a first end 31 and a second end 32. The curved jaw element 30 is connected to the base 28 near its second end 32 with a base pivot connection 34. As such, the curved jaw element 30 is free to rotate about the base pivot connection 34, relative the base 28, along a curved path 36.

The upper mold head 24 is connected to the curved jaw element 30 proximate its first end 31. In this manner, the upper mold head 24 rotates with the curved jaw element 30 along the curved path 36. This enables the upper mold head 24 to move along the curved path 36 from a fully open position to a fully closed position. The fully closed position is shown in FIG. 3. In the fully closed position, the upper mold head 24 seats atop the lower mold head 26 to seal the compression chamber 16. The fully open position is shown in FIG. 2. In the fully open position, the upper mold head 24 is drawn away from the lower mold head 26 and the compression chamber 16 is exposed.

In FIG. 2 and FIG. 3, it can be seen that the curved jaw element 30 is connected to a short linkage element 38. The short linkage element 38 has a first end 39 and an opposite second end 41. The short linkage element 38 is connected to the curved jaw element 30 with a first pivot connection 42 near the first end 39 of the short linkage element 38. The first pivot connection 42 joins the short linkage element 38 to the curved jaw element 30 at a point just above the middle of the curved jaw element 30.

A long linkage element 40 is provided. The long linkage element 40 has a first end 43 and an opposite second end 44. The first end 43 of the long linkage element 40 is connected to the base 28 at a second pivot connection 46. The second pivot connection 46 is positioned at an elevation that is higher than that of the first pivot connection 42. Furthermore, the second pivot connection 46 is positioned behind the curved jaw element 30 so as not to interfere with the movement of the curved jaw element 30 about the base pivot connection 34.

The second end 41 of the short linkage element 38 and the second end 44 of the long linkage element 40 are coupled together at a common joint 48. A primary hydraulic piston 50 is provided. The primary hydraulic piston 50 has a casing 52 that is mounted in a static position on the base 28. An actuator 54 extends from the casing 52 when the primary hydraulic piston 50 is activated. The actuator 54 is connected to the same joint that joins the short linkage element 38 to the long linkage element 40.

In FIG. 2, the primary hydraulic piston 50 is shown with the actuator 54 fully retracted. This pulls the joint 48 between the short linkage element 38 and the long linkage element 40 down to its lowest elevation. As a result, the curved jaw element 30 is rotated along the curved path 36 in the clockwise direction. This movement lifts the upper mold head 24 away from the lower mold head 26. The result is an opening 56 between the upper mold head 24 and the lower mold head 26 by which the slab of meat 20 can be placed into the compression chamber 16 or removed from the compression chamber 16.

When the primary hydraulic piston 50 is activated and the actuator 54 extends, the food press machine 10 changes from the open configuration of FIG. 2 to the closed configuration of FIG. 3. When the actuator 54 extends, the primary hydraulic piston 50 raises the elevation of the joint 48 between the short linkage element 38 and the long linkage element 40. This causes the curved jaw element 30 to rotate about the base pivot connection 34. The result is that the upper mold head 24 moves toward the lower mold head 26 following the curved path 36. That is, the upper mold head 24 is both moving downward and forward along the curved path 36. The actuator 54 stops when the short linkage element 38 and the long linkage element 40 are generally linearly aligned. This corresponds to the configuration where the upper mold head 24 seats atop the lower mold head 26 and no access opening exists between the upper mold head 24 and the lower mold head 26.

The use of the short linkage element 38 and the long linkage element 40 to rotate the curved jaw element 30, provides a degree of mechanical advantage to the food press machine 10. The combination of the pivoting action of the curved jaw element 30 with the movement of both the short and long linkages 38, 40 enables the upper mold head 24 to press against the lower mold head 26 with a force that can be more than twice that of the force applied directly by the primary hydraulic piston 50. The result is that the food press machine 10 can operate with a smaller hydraulic piston, and/or a smaller pneumatic pump when compressing the slab of meat 20. As a consequence, less energy is used.

It will be understood that when the slab of meat 20 is placed within the compression chamber 16, the upper mold head 24 moves to compress the slab of meat 20 against the stationary lower mold head 26. The movement of the upper mold head 24, however, is not linear in the vertical plane like prior art presses. Rather, the upper mold head follows the curved path 36 as it engages the slab of meat 20. This applies a slight twist to the slab of meat 20 during the compression cycle of the food press machine 10. The slight rotational movement inhibits the slab of meat 20 from rippling during compression. Furthermore, the slight rotational movement prevents layers of meat and fat from separating. The result is a shaped processed slab of meat 22 with less scrap.

Figure 4:
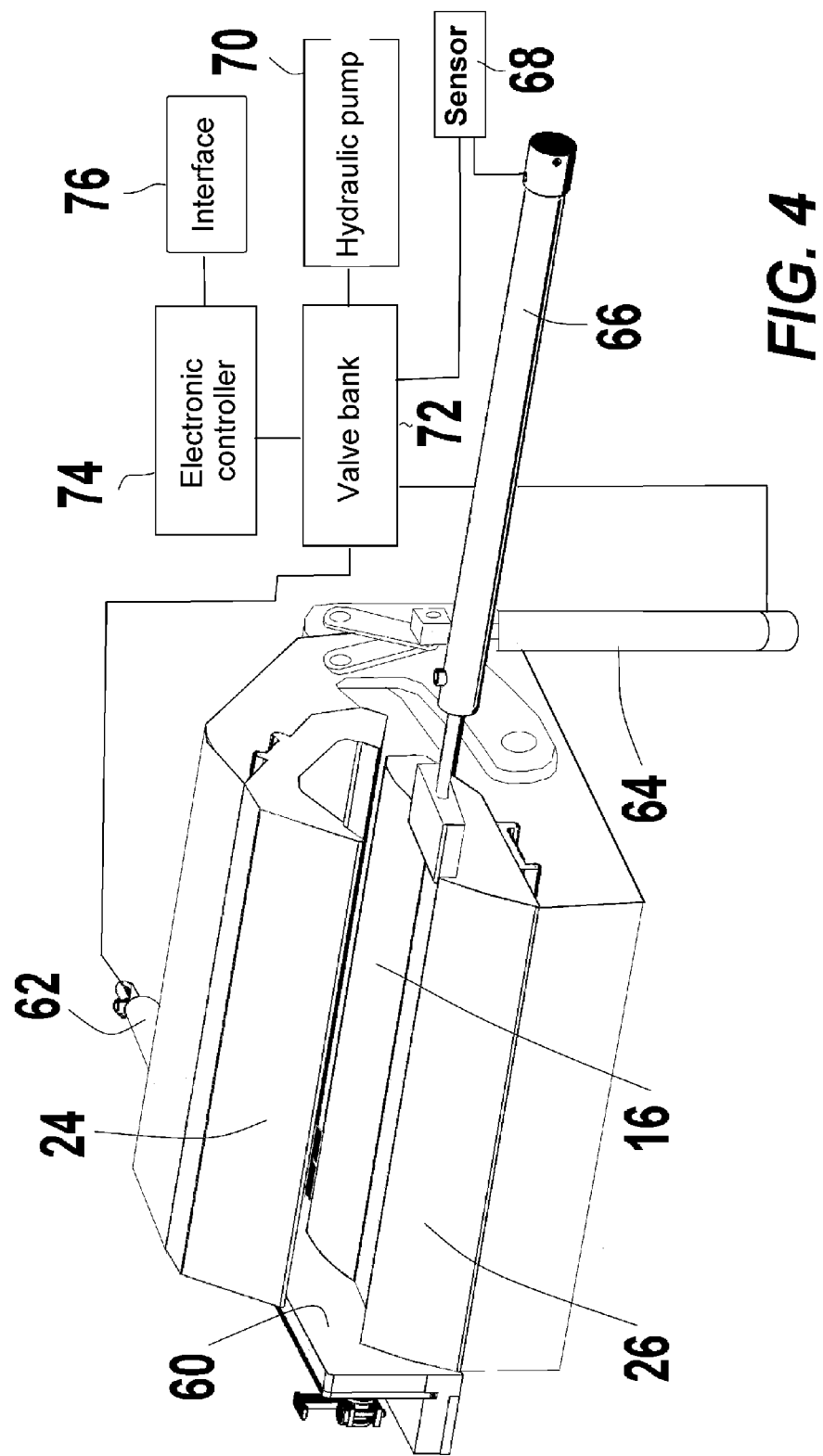
FIG. 4 shows the primary and secondary hydraulic components of the food press machine.

Referring now to FIG. 4 in conjunction with FIGS. 2 and 3, the lateral compression action of the food press machine 10 can now be explained. A press plate 60 is provided at the distal ends of the upper mold head 24 and the lower mold head 26. The press plate 60 is extended and retracted by a small hydraulic piston 62. When extended, the press plate 60 obstructs one side of the compression chamber 16. A ram head 64 is provided. The ram head 64 extends into the compression chamber 16 and obstructs the side of the compression chamber 16 opposite the press plate 60. The ram head 64 is driven by a lateral hydraulic piston 66. The pressure applied by the lateral hydraulic piston 66 is monitored by a pressure sensor 68.

The various hydraulic pistons 50, 62, 66 are supplied hydraulic fluid by a hydraulic pump 70. The output of the hydraulic pump 70 is regulated by a bank of hydraulic valves 72. The hydraulic valves 72 are controlled by an electronic systems controller 74. A user's interface 76 for the electronic systems controller 74 is provided on the exterior of the food press machine so that it can be readily reached by a machine operator.

Referring to all figures together, it can now be understood that in order to operate the food press machine 10 the systems controller 74 configures the food press machine 10 to its starting configuration. In the starting configuration, the press plate 60 is extended to block one side of the compression chamber 16. The primary hydraulic piston 50 is retracted to pull the upper mold head 24 away from the lower mold head 26. This creates the loading access opening 56 to the compression chamber 16. The lateral hydraulic piston 66 is also retracted to move the ram head 64 out of the compression chamber 16.

A natural slab of meat 20 is placed inside the compression chamber 16. The loading door 14 is closed and the compression cycle is started. Once the compression cycle is started, the primary hydraulic piston 50 and the lateral hydraulic piston 66 begin to extend. As the primary hydraulic piston 50 extends, the upper mold head 24 is driven along the curved path 36 toward the lower mold head 26. This compresses the slab of meat 20 both top-to-bottom and front-to-back. After the primary hydraulic piston 50 is driven to its full stroke, the upper mold head sets atop the lower mold head, such as is shown in FIG. 3.

As the slab of meat 20 is compressed top-to-bottom and front-to-back by the upper and lower mold heads 24, 26, the slab of meat 20 expands from side-to side inside the compression chamber 16. The side-to-side expansion is regulated by the advancing ram head 64. The ram head 64 presses the slab of meat 20 against the press plate 60 with a predetermined force of between fifteen and forty pounds per square inch, depending upon the type of meat being compressed. The stroke of the lateral hydraulic piston 66 is controlled by pressure, not by stroke distance. Once the lateral hydraulic piston 66 reaches the preselected pressure, the ram head 64 stops. The ram head 64 may even retract if the pressure in the compression chamber 16 increases to a pressure over the preselected threshold pressure.

It will therefore be understood that slabs of meat having different masses, different densities, and different fat content will all be shaped into the width and height of the compression chamber 16 by the upper and lower mold heads 24, 26. However, the length of the processed slab of meat 22 will vary. By varying the position of the ram head 64 as a function of pressure, the food press machine 10 can self-adjust to natural slabs of meat 20 of different sizes, weights and densities. In this manner, the mold heads 24, 26 need not be changed as the natural slabs of meat 20 change.

The side-to-side compression created by the lateral hydraulic piston 66 pressing the ram head 64 against the slab of meat 20, causes the processed slab of meat 22 to have generally vertical sides when exiting the food press machine 10. This causes the processed slab of meat 22 to be uniform in shape from side to side. Thus, the processed slab of meat 22 can be cut with little scrap.

After the compression cycle is complete, the ejection cycle begins. During the ejection cycle, the press plate 60 is retracted away from the side of the compression chamber 16. The primary hydraulic piston 50 then retracts to raise the upper mold head 24 away from the processed slab 22 in the compression chamber 16. The lateral hydraulic piston 66 then extends the ram head 64 against the processed slab of meat 22. The ram head 64 pushes the processed slab of meat 22 out of the compression chamber 16, beyond the retracted press plate 60. The ram head 64 is then retracted and the press plate 60 is extended closed. The compression chamber 16 is then ready to receive a new slab of meat.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A food press machine assembly, comprising:
a base;
a jaw element having a first end and a second end, wherein said jaw element is connected to said base at a pivot connection adjacent said second end, wherein said jaw element is free to rotate about said pivot connection along a curved path relative said base between a closed position and an open position;
a first linkage coupled to said jaw element at a second pivot connection, wherein said second pivot connection is located at an intermediate position between said first end and said second end of said jaw element;
a second linkage has one end coupled to said first linkage at a common joint and a second end that is joined to said base;
a piston coupled to said first linkage, wherein said piston moves said first linkage and said first linkage moves said jaw element along said curved path between said closed position and said open position;
a lower mold head mounted to said base;
an upper mold head mounted to said jaw element that moves with said jaw element;
wherein said upper mold head aligns atop said lower mold head and defines a compression chamber between said upper mold head and said lower mold head when said jaw element is in said closed position, and wherein said upper mold head is lifted away from said lower mold head exposing said compression chamber when said jaw element is in said open position.

2. The assembly according to claim 1, wherein said first linkage and said second linkage together limit movement of said jaw element along said curved path to between said open position and said closed position.

3. The assembly according to claim 2, wherein said piston is connected to said common joint and moves both said first linkage and said second linkage.

4. The assembly according to claim 1, further including a ram head that extends laterally into said compression chamber.

5. The assembly according to claim 4, further including a controller for causing said ram head to extend into said compression chamber only until said ram head encounters a predetermined threshold force.

6. The assembly according to claim 1, wherein said piston is hydraulically driven.

7. A food press machine assembly, comprising:
a base;
a stationary lower mold head supported by said base;
a jaw element coupled to said base at a first pivot connection;
an upper mold head supported by said jaw element;
mechanical linkages that extend between said jaw element and said base, wherein said mechanical linkages guide movement of said jaw element and said upper mold head along a curved path between a closed position and an open position, wherein said upper mold head aligns atop said lower mold head and defines a compression chamber between said upper mold head and said lower mold head when in said closed position, and wherein said upper mold head is lifted away from said lower mold head exposing said compression chamber when in said open position wherein said mechanical linkages include a first linkage that is pivotably connected to said jaw element and a second linkage that is pivotably connected to said base;
a piston that extends between said base and said mechanical linkages for moving said mechanical linkages and causing said upper mold head to move along said curved path between said closed position and said open position.

8. The assembly according to claim 7, wherein said first linkage and said second linkage are interconnected at a common joint.

9. The assembly according to claim 8, wherein said piston is connected to said common joint and moves said upper mold head and said jaw element by moving said mechanical linkages at said common joint.

10. The assembly according to claim 7, further including a ram head that extends laterally into said compression chamber.

11. The assembly according to claim 10, further including a controller for causing said ram head to extend into said compression chamber only until said ram head encounters a predetermined threshold force.

* * * * *